(12) United States Patent
Uchino et al.

(10) Patent No.: US 10,020,873 B2
(45) Date of Patent: Jul. 10, 2018

(54) MOBILE STATION

(71) Applicant: NTT DOCOMO, INC., Tokyo (JP)

(72) Inventors: Tooru Uchino, Tokyo (JP); Yoshiaki Ofuji, Tokyo (JP); Kohei Kiyoshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/908,292

(22) PCT Filed: Jul. 18, 2014

(86) PCT No.: PCT/JP2014/069206
§ 371 (c)(1),
(2) Date: Jan. 28, 2016

(87) PCT Pub. No.: WO2015/016088
PCT Pub. Date: Feb. 5, 2015

(65) Prior Publication Data
US 2016/0173188 A1 Jun. 16, 2016

(30) Foreign Application Priority Data
Jul. 31, 2013 (JP) .................... 2013-159019

(51) Int. Cl.
*H04B 7/185* (2006.01)
*H04W 74/08* (2009.01)

(52) U.S. Cl.
CPC .... *H04B 7/18513* (2013.01); *H04W 74/0833* (2013.01)

(58) Field of Classification Search
CPC .............. H04B 7/18513; H04W 74/0833
See application file for complete search history.

(56) References Cited

U.S. PATENT DOCUMENTS 8,879,605 B1 * 11/2014 Shah .................... H04B 7/2668
375/130
8,977,191 B2 * 3/2015 Jong .................. H04B 7/18513
455/12.1

(Continued)

FOREIGN PATENT DOCUMENTS

JP  2000-506346 A  5/2000
JP  2001-86054 A   3/2001

(Continued)

OTHER PUBLICATIONS

International Search Report issued in corresponding application No. PCT/JP2014/069206 dated Aug. 12, 2014 (4 pages).

(Continued)

*Primary Examiner* — Wutchung Chu
*Assistant Examiner* — Kai Chang
(74) *Attorney, Agent, or Firm* — Osha Liang LLP

(57) ABSTRACT

Even in the case of satellite communications to which LTE is applied, a difference between reception timings of uplink singles transmitted from a plurality of mobile stations UE located in the same cell is kept within GI specified in LTE. A mobile station UE#1 according to the present invention includes: an offset calculation unit 23 configured to calculate an offset δ from a transmission timing to be referenced, based on a distance $L_x$ between the mobile station UE#1 and a satellite 1 used in satellite communications, and a distance $L_{ref}$ between the satellite 1 and a reference mobile station UE; and an RACH functional unit 24 configured to adjust a transmission timing of a random access preamble based on the calculated offset δ.

3 Claims, 7 Drawing Sheets

(56) References Cited

U.S. PATENT DOCUMENTS

| | | | |
|---|---|---|---|
| 2004/0014452 A1* | 1/2004 | Lim | H04B 7/18558 |
| | | | 455/403 |
| 2007/0066231 A1* | 3/2007 | Duffett-Smith | G01S 19/05 |
| | | | 455/67.11 |
| 2007/0159957 A1* | 7/2007 | Ljung | H04L 27/2607 |
| | | | 370/208 |
| 2009/0196332 A1 | 8/2009 | Miyatani | |
| 2011/0151923 A1* | 6/2011 | Mesecher | H04B 7/086 |
| | | | 455/550.1 |
| 2011/0310857 A1* | 12/2011 | Vujcic | H04W 74/0833 |
| | | | 370/336 |
| 2012/0100799 A1* | 4/2012 | Tsuchimoto | H04B 7/18513 |
| | | | 455/9 |
| 2012/0172048 A1* | 7/2012 | Kato | H04L 5/0007 |
| | | | 455/450 |
| 2013/0045759 A1* | 2/2013 | Smith | H04W 64/00 |
| | | | 455/456.6 |
| 2013/0051264 A1 | 2/2013 | Wang et al. | |
| 2013/0201910 A1* | 8/2013 | Bergstrom | H04L 5/001 |
| | | | 370/328 |
| 2014/0044097 A1* | 2/2014 | Chen | H04W 36/24 |
| | | | 370/331 |
| 2015/0078250 A1* | 3/2015 | Mineta | H04J 13/10 |
| | | | 370/320 |
| 2015/0296539 A1* | 10/2015 | Guo | H04W 74/08 |
| | | | 370/329 |

FOREIGN PATENT DOCUMENTS

| | | |
|---|---|---|
| JP | 2009-188551 A | 8/2009 |
| JP | 2011-29720 A | 2/2011 |
| JP | 2013-46418 A | 3/2013 |
| WO | 97/33383 A1 | 9/1997 |
| WO | 01/05170 A1 | 1/2001 |
| WO | 2010/029413 A1 | 3/2010 |

OTHER PUBLICATIONS

Written Opinion issued in corresponding application No. PCT/JP2014/069206 dated Aug. 12, 2014 (4 pages).

3GPP TS 36.321 V10.9.0; 3rd Generation Partnership Project; Technical Specification Group Radio Access Network; Evolved Universal Terrestrial Radio Access (E-UTRA); Medium Access Control (MAC) protocol specification (Release 10); Jun. 2013 (54 pages).

Extended European Search Report dated Feb. 6, 2017, in corresponding European Patent Application No. 14833059.0 (7 pages).

Bastia et al., "LTE Adaptation for Mobile Broadband Satellite Networks", EURASIP Journal on Wireless Communications and Networking, vol. 2009, Article ID989062, (13 pages).

ETSI TR 102 662 V.1.1.1, Technical Report, "Satellite Earth Stations and Systems (SES); Advanced satellite based scenarios and architectures for beyond 3G systems", Mar. 2010 (264 pages).

* cited by examiner

/ 1

MOBILE STATION

TECHNICAL FIELD

The present invention relates to a mobile station.

BACKGROUND ART

LTE (Long Term Evolution) employs a configuration to adjust transmission timings of uplink signals by using an RA (Random Access) procedure and "TAC MAC-CE (Timing Advance Command Media Access Control-Control Element)".

Specifically, as illustrated in steps S201 to S207 in FIG. 5, a radio base station eNB is configured to firstly perform an RA procedure to notify a mobile station UE of an absolute value for adjustment of the transmission timings of uplink signals, and then to use "TAC MAC-CE" to notify the mobile station UE of a relative value for the adjustment of the transmission timings of uplink signals As a result, as illustrated in FIG. 6, a difference between reception timings of uplink signals transmitted by mobile stations UE#1 and UE#2 located in a single cell under the radio base station eNB can be kept within GI (Guard Interval) specified in LTE.

PRIOR ART DOCUMENT

Non-Patent Document

Non-patent document 1: 3GPP TS36.321

SUMMARY OF THE INVENTION

At present, application of LTE to satellite communications is under consideration. Here, in the case of satellite communications, the radius of each cell is large as illustrated in FIG. 7. For this reason, satellite communications to which LTE is applied have a problem in that a difference between reception timings of uplink signals transmitted by the mobile stations UE#1 and UE#2 located in the same cell cannot be kept within GI specified in LTE, as illustrated in FIG. 8.

Hence, the present invention has been made in light of the foregoing problem, and has an objective to provide a mobile station with which, even in the case of satellite communications to which LTE is applied, a difference between reception timings of uplink signals transmitted by a plurality of mobile stations located in the same cell can be kept within GI specified in LTE.

A first feature of the present invention is summarized as a mobile station usable in satellite communications to which LTE is applied, the mobile station including: an offset calculation unit configured to calculate an offset from a transmission timing to be referenced, based on a distance between the mobile station and a satellite used in the satellite communications, and a distance between the satellite and a reference mobile station; and an RACH functional unit configured to adjust a transmission timing of a random access preamble based on the calculated offset.

DETAILED DESCRIPTION (Mobile Communication System According to First Embodiment of the Invention)

A mobile communication system according to a first embodiment of the present invention is described with reference to FIGS. 1 to 4.

Figure 1:
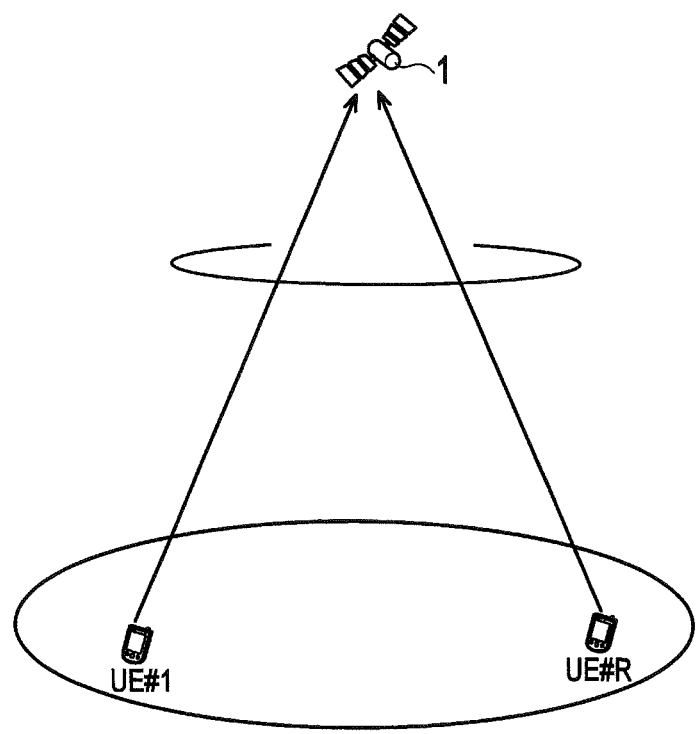
FIG. 1 is an overall configurational view of a mobile communication system according to a first embodiment of the present invention.

As illustrated in FIG. 1, the mobile communication system according to the present embodiment includes a satellite 1. It is to be noted that LTE is applied to satellite communications in the mobile communication system according to the present embodiment. The satellite 1 is equipped with a radio base station eNB of LTE (or functions of the radio base station eNB). Instead, the radio base station eNB may be installed on the earth and the satellite 1 may operate as a relay apparatus (relay node).

The example of FIG. 1 is based on the assumption that a mobile station UE#1 and a reference mobile station UE#R are present in the same cell of satellite communications performed via the satellite 1.

Figure 2:
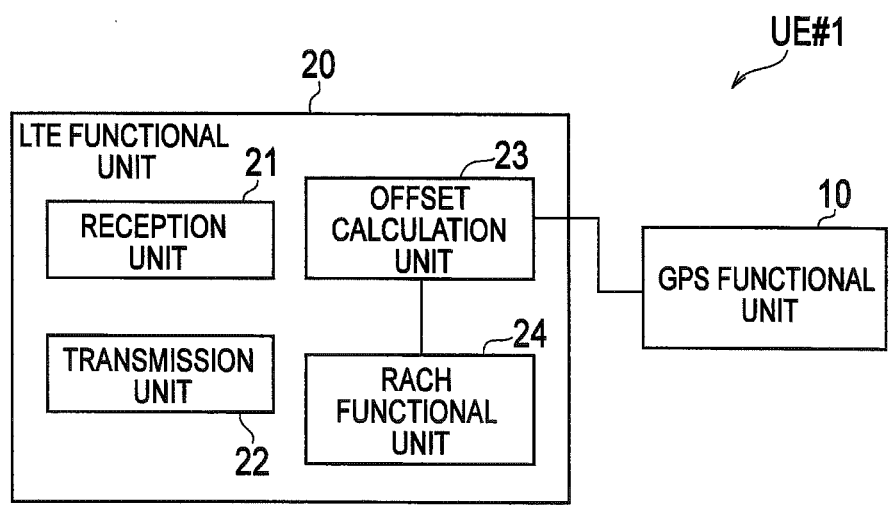
FIG. 2 is a functional block diagram of a mobile station according to the first embodiment of the present invention.

As illustrated in FIG. 2, the mobile station UE#1 according to the present embodiment includes a GPS functional unit 10 and an LTE functional unit 20.

Here, the GPS functional unit 10 may be configured to perform communications with a GPS satellite supporting LTE, or to perform communications with another GPS satellite.

Then, the LTE functional unit 20 includes a reception unit 21, a transmission unit 22, an offset calculation unit 23, and an RACH functional unit 24.

The reception unit 21 is configured to receive downlink signals transmitted by the satellite 1. The transmission unit 22 is configured to transmit uplink signals to the satellite 1.

The offset calculation unit 23 is configured to calculate an offset δ (an offset value δ) from a transmission timing to be referenced.

For example, the offset calculation unit 23 may be configured to calculate the offset δ from the transmission timing to be referenced, on the basis of a distance $L_x$ between the satellite 1 and the mobile station UE#1, and a distance $L_{ref}$ between the satellite 1 and the reference mobile station UE#R.

In this connection, the offset calculation unit 23 may be configured to acquire the distance $L_x$ and the distance $L_{ref}$ from the GPS functional unit 10. For example, the distance $L_x$ and the distance $L_{ref}$ may be calculated from location information (e.g., the latitudes and longitudes) of the mobile station UE#1, the reference mobile station UE#R, and the satellite 1. Instead, the offset calculation unit 23 may be configured to acquire the distance $L_{ref}$ from the reference mobile station UE#R.

Figure 3:
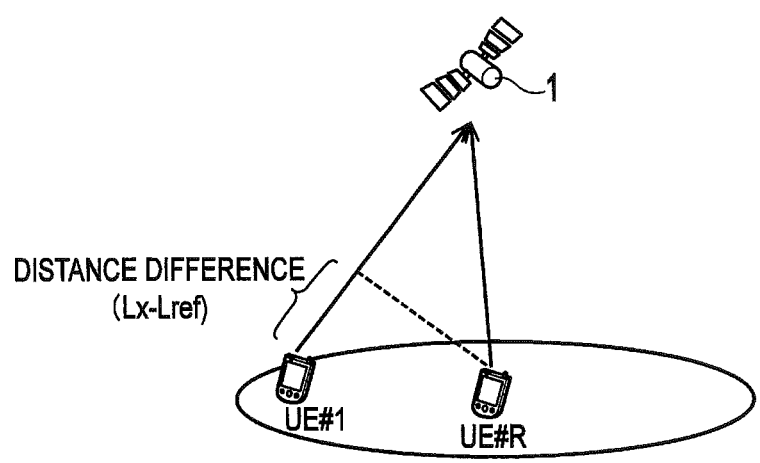
FIG. 3 is a diagram for explaining an example of a method of measuring a distance difference by the mobile station according to the first embodiment of the present invention.

Specifically, as illustrated in FIG. 3, the offset calculation unit 23 may be configured to calculate the offset δ in accordance with "$\delta=(L_x-L_{ref})\times 2/c$". In this equation, "c" denotes a light speed. Note that, in order to take both the uplink and the downlink into account, the distance difference "$L_x-L_{ref}$" is multiplied by 2 in the calculation of the offset δ.

Moreover, the foregoing transmission timing to be referenced may be broadcasted to the mobile station UE#1 via a network (e.g., via a radio resource of the satellite 1), or may be a value (predetermined value) embedded in the mobile station UE#1.

Further, the offset calculation unit 23 may be configured to calculate the offset δ periodically, or to calculate the offset δ at a predetermined event such as "UL data resuming".

Here, the offset calculation unit 23 may be configured to, if failing to calculate the offset δ, recalculate the offset δ upon the elapse of a predetermined period after the failure.

For such a case, the offset calculation unit 23 may be configured to make a notification of the failure in the calculation of the offset δ via a user interface such as a display.

The RACH (Random Access Channel) functional unit 24 is configured to perform an RA procedure in the mobile station UE#1.

For example, the RACH functional unit 24 is configured to transmit a random access preamble based on the offset δ calculated by the offset calculation unit 23. More specifically, the RACH functional unit 24 is configured to adjust the transmission timing of the random access preamble based on the offset δ.

Hereinafter, operations of the mobile communication system according to the present embodiment are described with reference to FIG. 4.

Figure 4:
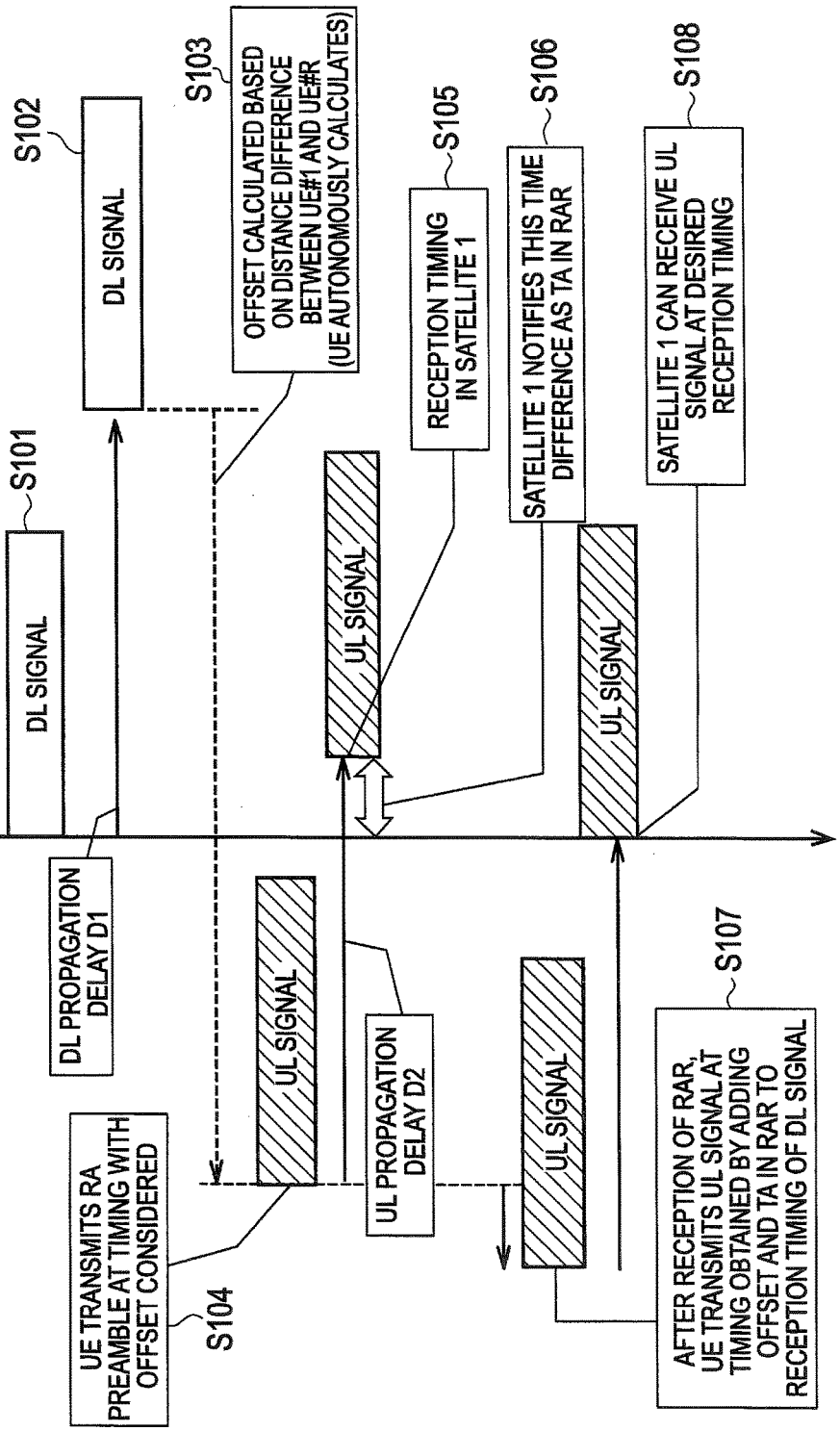
FIG. 4 is a diagram for explaining operations of the mobile station according to the first embodiment of the present invention.
Figure 5:
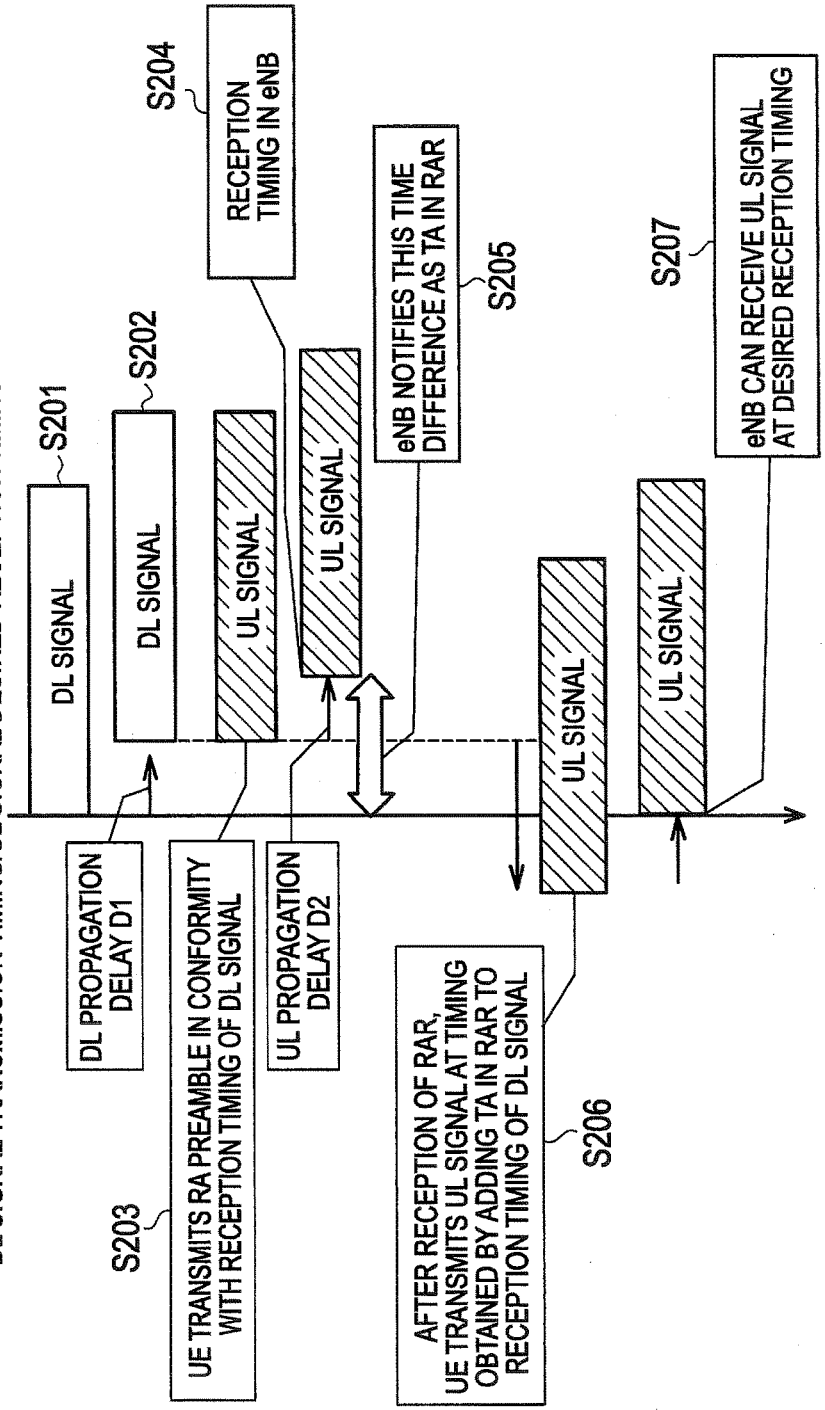
FIG. 5 is a diagram for explaining a conventional technique.
Figure 6:
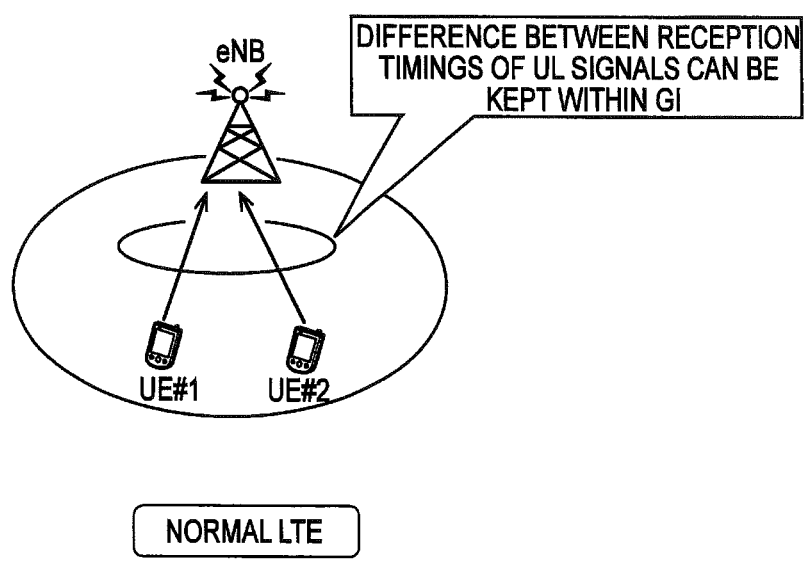
FIG. 6 is a diagram for explaining the conventional technique.
Figure 7:
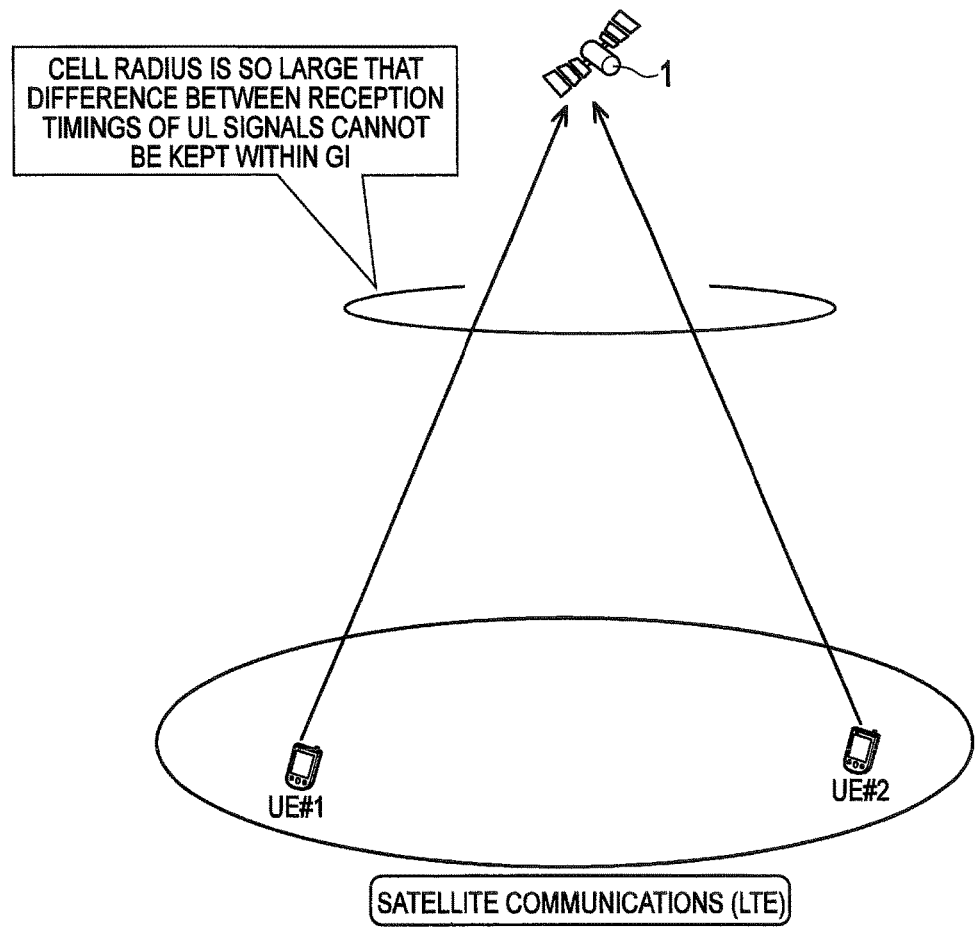
FIG. 7 is a diagram for explaining the conventional technique.
Figure 8:
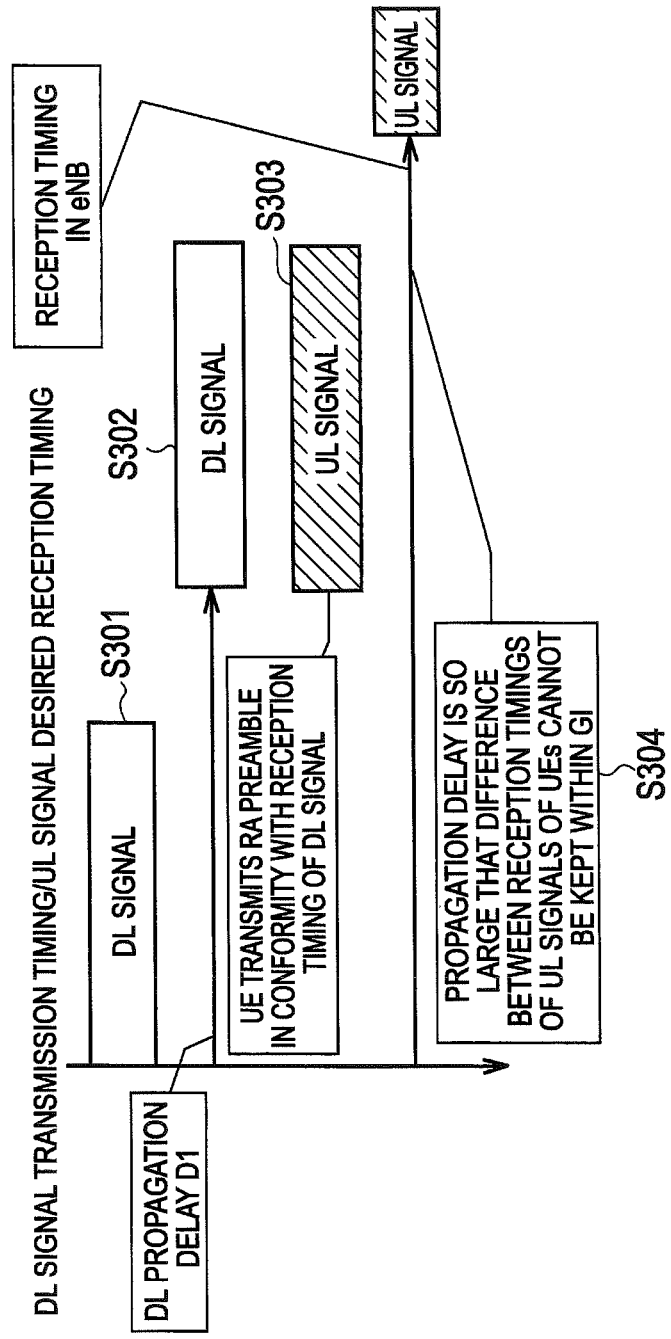
FIG. 8 is a diagram for explaining the conventional technique.

As presented in FIG. 4, in step S101, the satellite 1 transmits a downlink signal to the mobile station UE#1. In step S102, the mobile station UE#1 receives the downlink signal with a propagation delay D1.

The mobile station UE#1 calculates the offset δ based on the aforementioned distance difference "$L_x-L_{ref}$" in step S103, and transmits a random access preamble to the satellite 1 at a timing with the offset δ taken into account in step S104. More specifically, the mobile station UE#1 transmits the random access preamble at the timing obtained by applying the offset δ to the transmission timing to be referenced.

The satellite 1 receives the random access preamble with a propagation delay D2 in step S105. The satellite 1 transmits a random access response (RAR) to the mobile station UE#1 in step S106. The random access response contains, as TA (Timing Advance), a time difference between a desired reception timing of an uplink signal and the reception timing of the random access preamble received by the satellite 1 in step S105.

After the mobile station UE#1 receives the random access response in step S107, the mobile station UE#1 transmits an uplink signal to the satellite 1 at a timing obtained by applying the offset δ and the time difference notified as TA to the transmission timing to be referenced.

As a result, the satellite 1 can receive the uplink signal from the mobile station UE#1 at the desired reception timing in step S108.

The foregoing features of the present embodiment may be expressed as follows.

A first feature of the present embodiment is summarized as a mobile station UE#1 usable in satellite communications to which LTE is applied, the mobile station UE#1 including:

an offset calculation unit 23 configured to calculate an offset δ from the transmission timing to be referenced, based on a distance $L_x$ between the mobile station UE#1 and a satellite 1 used in the satellite communications, and a distance $L_{ref}$ between the satellite 1 and a reference mobile station UE#R; and an RACH functional unit 24 configured to adjust a transmission timing of a random access preamble based on the calculated offset δ.

According to this feature, the RACH functional unit 24 is configured to adjust the transmission timing of the random access preamble based on the offset δ calculated from the distance $L_x$ and distance $L_{ref}$ described above. Thus, in the satellite 1, a difference between the reception timings of uplink signals transmitted from a plurality of mobile stations UE#1 and UE#R located in the same cell can be kept within about GI.

In the first feature of the present embodiment, the transmission timing to be referenced may be broadcasted by a network.

According to this feature, the network can efficiently make a notification of the appropriate transmission timing to be referenced to all the mobile stations UE located in the cell under the satellite 1.

In the first feature of the present embodiment, the offset calculation unit 23 may be configured to calculate the offset δ periodically.

According to this feature, the periodical calculation of the offset δ by the mobile station UE#1 enables the difference between the reception timings of uplink signals transmitted from the plurality of mobile stations UE#1 and UE#R located in the same cell to be usually kept within about GI in the satellite 1.

In the first feature of the present embodiment, the offset calculation unit 23 may be configured to calculate the offset δ in accordance with "$\delta=(L_x-L_{ref})\times 2/c$".

According to this feature, since the distance difference "$L_x-L_{ref}$" is multiplied by 2, the offset δ can be calculated with both the uplink and the downlink taken into account.

It should be noted that the foregoing operations of the satellite 1 and the mobile station UE may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the satellite 1 and the mobile station UE. Otherwise, the storage medium and the processor may be provided as discrete components inside the satellite 1 and the mobile station UE.

Hereinabove, the present invention has been described in detail by use of the foregoing embodiment. However, it is apparent to those skilled in the art that the present invention should not be limited to the embodiment described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-159019 (filed on Jul. 31, 2013) is incorporated by reference in the present specification.

INDUSTRIAL APPLICABILITY

As described above, according to the present invention, even in the case of satellite communications to which LTE is applied, a difference between reception timings of uplink signals transmitted from a plurality of mobile stations located in the same cell can be kept within GI specified in LTE.

EXPLANATION OF THE REFERENCE NUMERALS 1 satellite
UE#1 mobile station
10 GPS functional unit
20 LTE functional unit
21 reception unit
22 transmission unit
23 offset calculation unit
24 RACH functional unit

The invention claimed is:

1. A mobile station usable in satellite communications to which LTE is applied, comprising:
a processor that:
calculates an offset from a transmission timing to be referenced, based on a distance between the mobile station and a satellite used in the satellite communications, and a distance between the satellite and a reference mobile station; and
adjusts a transmission timing of a random access preamble based on the calculated offset,
a transmitter that transmits, to the satellite, the random access preamble based on the adjusted transmission timing,
wherein the processor calculates the offset $\delta$ in accordance with "$\delta=(L_x-L_{ref})\times 2/c$", where "$L_x$" is the distance between the satellite and the mobile station, "$L_{ref}$" is the distance between the satellite and the reference mobile station, and "c" is a light speed.

2. The mobile station according to claim 1, wherein the transmission timing to be referenced is broadcasted by a network.

3. The mobile station according to claim 1, wherein the processor that periodically calculates the offset.

* * * * *